United States Patent [19]

Hosoda

[11] 4,325,618
[45] Apr. 20, 1982

[54] LIGHT SOURCE APPARATUS

[75] Inventor: Seiichi Hosoda, Fuchu, Japan

[73] Assignee: Olympus Optical Co., Ltd., Tokyo, Japan

[21] Appl. No.: 181,840

[22] Filed: Aug. 27, 1980

[30] Foreign Application Priority Data

Sep. 17, 1979 [JP] Japan ................................. 54-17867

[51] Int. Cl.³ .......................... G03B 7/16; G03B 29/00
[52] U.S. Cl. ......................................... 354/33; 354/51;
354/62; 354/126; 128/6; 128/8
[58] Field of Search ...................... 354/24, 32, 33, 51,
354/62, 63, 75, 76, 126; 128/6, 8

[56] References Cited

U.S. PATENT DOCUMENTS

| 4,057,809 | 11/1977 | Nakamoto et al. | 354/24 |
| 4,086,583 | 4/1978 | Takahashi | 354/62 |
| 4,153,356 | 5/1979 | Hama | 354/62 |

FOREIGN PATENT DOCUMENTS 2741714 3/1978 Fed. Rep. of Germany .

54-98241 8/1979 Japan .

Primary Examiner—Russell E. Adams
Attorney, Agent, or Firm—Frishauf, Holtz, Goodman & Woodward

[57] ABSTRACT

A light source apparatus for a fiberscope comprises a xenon lamp for producing light of a required dose for illuminating a scene to be photographed through a light guide during the presence of a synchronizing signal, an integrating circuit for integrating light reflected from the scene according to the synchronizing signal, a comparator for producing a coincidence signal when the output signal of the integrating circuit coincides with a predetermined signal, a rotary solenoid energized according to the coincidence signal from the comparator, and a shutter plate mounted on a shaft of the rotary solenoid and serving to prevent light from the xenon lamp from entering the light guide when the solenoid is energized. Further, the light source means comprises a feedback circuit for supplying the output signal of the comparator through a positive feedback path to the integrating circuit to saturate the output signal thereof.

16 Claims, 9 Drawing Figures

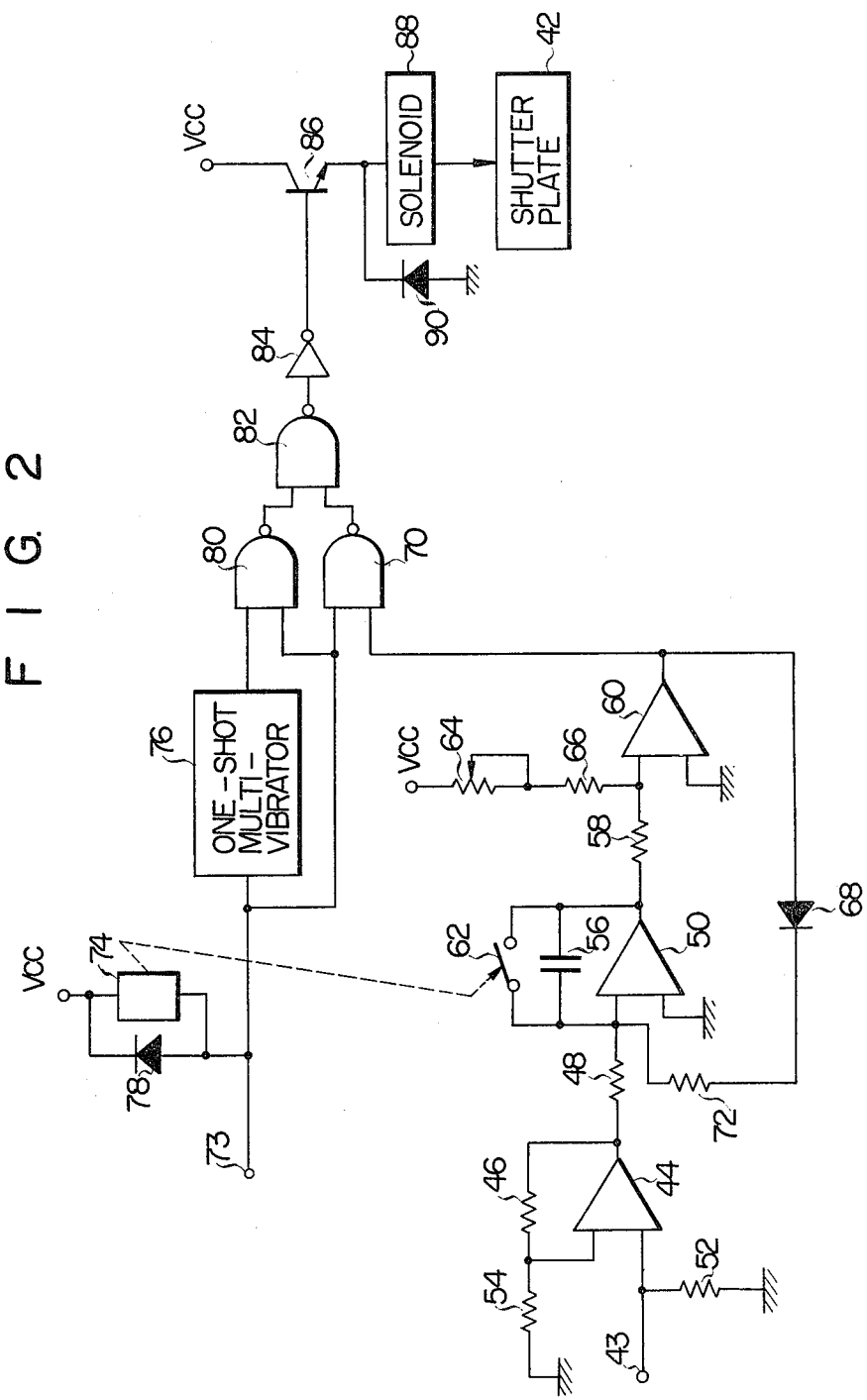
F I G. 2

F I G. 3A 
F I G. 3B 
F I G. 3C 
F I G. 3D 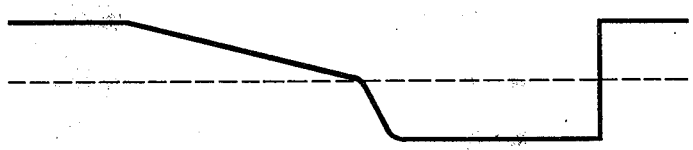
F I G. 3E 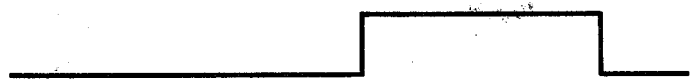
F I G. 3F 
F I G. 3G 

LIGHT SOURCE APPARATUS

BACKGROUND OF THE INVENTION

This invention relates to light source apparatus and, more particularly, to a light source apparatus for endoscopic photographing systems for photographing a body cavity with such medical apparatus as endoscopes.

Generally, endoscopic photographing is effected when the body cavity is observed with an endoscope. Since the body cavity is dark, it is not necessary to effect the photographing on the basis of the operation of the camera shutter, that is, the operation of passing and blocking light from a light source can be made to be the shutter operation. Since a light source apparatus for endoscopic photographing is required to provide light of a great dose, a xenon lamp is used. However, repeatedly operating the xenon lamp at short intervals is undesirable from the standpoint of its service life. Accordingly, the light source apparatus for an endoscope generally uses a shutter plate, which is provided between the xenon lamp and a light guide for leading light from the xenon lamp to an objective section of the endoscope and serves to pass and block the light from the xenon lamp. The passing and blocking of light from the xenon lamp are controlled by controlling the shutter plate from a rotary solenoid or the like. When the solenoid is in the energized state, it acts to let the shutter plate pass the light from the xenon lamp without being blocked, while in the de-energized state it lets the shutter plate block the light. Usually, for endoscopic photographing an ordinary single-lens reflex camera body is mounted in front of the eyepiece of the endoscope. The photographing is started by depressing a shutter release button of the camera. The xenon lamp is held "on" during the presence of a synchronizing signal from the camera, and the solenoid is energized according to the synchronizing signal. Light reflected from the illuminated scene is received by a light-receiving element in the endoscope, and the output signal from the light-receiving element is integrated. The integral value thus obtained is compared in a comparator with a predetermined value. When the integral value exceeds the predetermined value, the solenoid is de-energized to let the shutter plate block light from the xenon lamp, thus bringing an end to the exposure of the photographic film. After the de-energization of the solenoid, the synchronizing signal is still present so that the xenon lamp remains "on". Therefore, after the de-energization of the solenoid the integral value is likely to be varied due to noise or the like, and sometimes it is possible that the comparator produces an erroneous output to erroneously energize the solenoid again. In such a case, proper exposure cannot be obtained.

An object of the invention is to provide a light source apparatus for endoscopic or like photographing system which can prevent erroneous operation of a shutter mechanism due to noise or other causes and resultant loss of proper exposure from occurring.

SUMMARY OF THE INVENTION

The above object is achieved by a light source apparatus comprising a synchronizing terminal for receiving a synchronizing signal from a camera, a light reception terminal for receiving a light reception signal from the camera, light source means connected to the synchronizing terminal and producing light for illuminating a scene to be photographed according to the synchronizing signal, integrating means connected to the synchronizing terminal and a light reception terminal for calculating the received light dose by integrating the light reception signal according to the synchronizing signal to produce an integration signal corresponding to the received light dose, comparator means connected to the integrating means for comparing the integration signal and a predetermined signal to produce a comparison signal according to the result of comparison, positive feedback means connected between the output terminal of the comparator means and the input terminal of the integrating means, and shutter means connected to the comparator means for blocking light from the light source means according to the comparison signal.

BRIEF DESCRIPTION OF THE DRAWINGS

This invention can be more fully understood from the following detailed description when taken in conjunction with the accompanying drawings, in which:

FIG. 2 is a circuit diagram showing an exposure control circuit in the light source apparatus shown in FIG. 1; and FIGS. 3A to 3G form a time chart illustrating the operation of the light source apparatus shown in FIG. 1.

DETAILED DESCRIPTION

Figure 1:
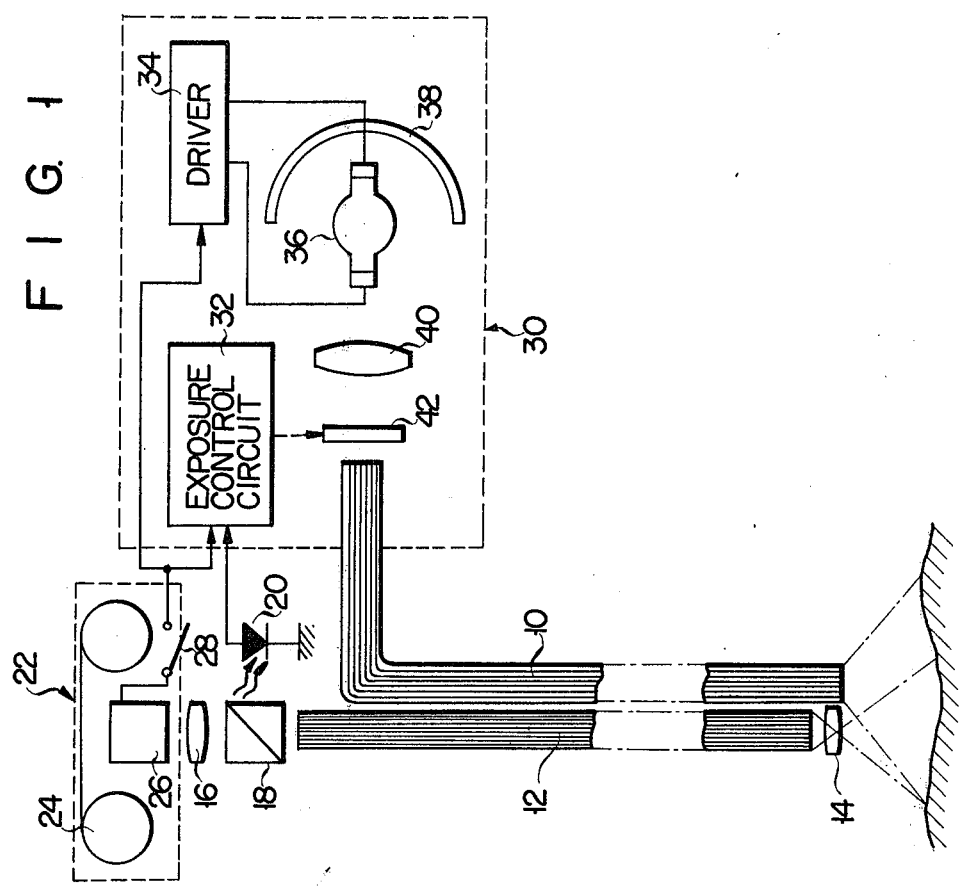
FIG. 1 is a schematic representation of an endoscopic photographing system using an embodiment of the light source apparatus according to the invention.

FIG. 1 outlines an endoscopic photographing system using an embodiment of the light source apparatus according to the invention. The endoscope shown in FIG. 1 is a commonly termed fiberscope with a still camera mounted at an eyepiece section for photographing the image obtained at the eyepiece section. As an endoscope which is used for the purpose of photographing there is another type named gastrocamera in which a camera is provided at the objective section, but the principles of the exposure control are the same, so only the fiberscope will be described. The fiberscope, as illustrated, has a light guide 10 constituted by an optical-fiber cable for transmitting illumination light and an image guide 12 also constituted by an optical-fiber cable for transmitting the light image of an illuminated scene. An objective lens 14 is provided in an objective section at one end of the image guide 12, and an eyepiece 16 is provided in an eyepiece section at the other end. A half mirror 18 is provided between the eyepiece 16 and the corresponding end of the image guide 12, and it reflects part of the incident light from the image guide 12 in a direction at right angles to the direction of incidence. On one side of the half mirror 18 a photodiode 20 is provided to receive the reflected light from the half mirror 18 and produces a light reception signal corresponding to the received light. A body 22 of an ordinary single-lens reflex camera is mounted in front of the eyepiece 16. This single-lens reflex camera 22 includes a film 24, a shutter 26 and a synchronizing switch 28. The light guide 10 includes a portion made integral with the image guide 12, and its end corresponds to the objective lens 14. The rest of it is led to a light source section 30. A signal from the photodiode 20 is supplied to an exposure control circuit 32 in the light source section 30, and a synchronizing signal from the synchronizing switch 28 is supplied to the exposure control circuit 32 and a driver 34 in the light source section 30.

The driver 34 is connected to a xenon lamp 36. The xenon lamp 36 is disposed to face the other end of the light guide 10 so that light from it is incident on the light guide 10. To provide for a high efficiency of incidence of light on the light guide 10 a reflector 38 is provided on the side of the lamp 36 opposite to the light guide 10 for reducing or eliminating leakage of light, and a focusing lens 40 is provided between the lamp 36 and light guide 10. A shutter plate 42 is adapted to be interposed between the focusing lens 40 and light guide 10 for blocking light from the xenon lamp 36. While in the illustrated construction the half mirror 18 and photodiode 20 are disposed to face one end of the image guide 12, it is possible to dispose them in front of the end of the light guide 10 within the light source section 30.

FIG. 2 shows the circuit diagram of the exposure control circuit 32. A light reception terminal 43, to which the light reception signal from the photodiode 20 within the endoscope body is supplied, is connected to one input terminal of an operational amplifier 44, which has its output terminal connected through a resistor 46 to its other input terminal and also connected through a resistor 48 to one input terminal of an operational amplifier 50. The two input terminals of the operational amplifier 44 are grounded through respective resistors 52 and 54. The operational amplifier 50 has its other input terminal grounded and its output terminal connected through a capacitor 56 to its first-mentioned input terminal and also connected through a resistor 58 to one input terminal of an operational amplifier 60. A normally closed relay switch 62 is connected between the opposite terminals of the capacitor 56. A voltage terminal $V_{cc}$ is connected through a variable resistor 64 and a resistor 66 to the aforesaid input terminal of the operational amplifier 60. The operational amplifier 60 has its other input terminal grounded and its output terminal connected to the anode of a diode 68 and also connected to one input terminal of a NAND gate 70. The diode 68 has its cathode connected through a resistor 72 to the first-mentioned input terminal of the operational amplifier 50.

A synchronizing terminal 73, to which the synchronizing signal from the synchronizing switch 28 within the camera 22 is supplied, is connected to a relay 74 and also to a one-shot multivibrator 76. The relay 74 functions to open the relay switch 62 when it is energized. The voltage terminal $V_{cc}$ is also connected to the other terminal of the relay 74, and a diode 78 is connected between the opposite terminals of the relay 74. The output signal of the one-shot multivibrator 76 is coupled to one input terminal of a NAND gate 80. The synchronizing terminal 73 is also connected to other input terminals of the NAND gates 70 and 80. The NAND gates 70 and 80 have their output terminals connected to respective input terminals of a NAND gate 82, which has its output terminal connected through an inverter 84 to the base of an NPN transistor 86. The transistor 86 has its collector connected to the voltage terminal $V_{cc}$ and its emitter connected to a rotary solenoid 88 and also to the cathode of a diode 90. The rotary solenoid 88 has a rotary shaft which carries the shutter plate 42 secured thereto. When it is energized, its rotary shaft is rotated to bring the shutter plate 42 to a position not blocking light from the lamp 36. The diode 90 has its anode grounded.

The operation of this embodiment will now be described with reference to FIGS. 3A to 3G. FIGS. 3A to 3G show waveforms appearing at various parts in FIG. 2. It is assumed that the xenon lamp 36 is normally emitting light of sufficient brightness for the endoscopic observation. Also, it is assumed that light required for the photographing is far brighter than light for the observation. Before the shutter is released, the synchronizing signal from the synchronizing switch 28 and the output signal from the one-shot multivibrator 76 are at an L (low) lever as respectively shown in FIGS. 3A and 3B, so that the output signal from the NAND gate 80 is at an H (high) level as shown in FIG. 3C. Also, the relay 74 is in the de-energized state, so that the relay switch is closed. Consequently, the output signal of the operational amplifier 50 is at a certain initial value as shown in FIG. 3D. The operational amplifier 60 acts as a comparator to produce the H level output signal when the output signal of the operational amplifier 50 supplied to one input terminal becomes lower than a certain threshold value. This threshold voltage is determined by the voltage at the voltage terminal $V_{cc}$, variable resistor 64 and resistor 66, and it is shown by a dashed line in FIG. 3D. Since the output signal of the operational amplifier 60 is at the L level as shown in FIG. 3E, the output signal of the NAND gate 70 is at the H level as shown in FIG. 3F. Since both the inputs to the NAND gate 82 are at the H level, the output signal thereof is at the L level, so that the output signal of the inverter 84 is at the H level as shown in FIG. 3G. Consequently, the transistor 86 is "on" so that the solenoid 88 is energized to hold the shutter plate 42 in a position not to block light from the lamp 36 to the light guide 10. Thus, in this state one can observe the illuminated scene through the viewfinder of the camera 22 and determine the angle of photographing.

When a shutter release button of the camera 22 is depressed, the forward curtain of the camera is released, whereupon the synchronizing signal is changed to the H level as shown in FIG. 3A. Since the shutter speed of the camera is considerably long, being set to ¼ second in this embodiment, the synchronizing signal having been changed to the H level is held at that level for ¼ second as shown in FIG. 3A. In response to this synchronizing signal, the brightness of light from the xenon lamp 36 is increased to a value required for the photographing. With the rising of the synchronizing signal the one-shot multivibrator 76 produces a single pulse as shown in FIG. 3B. The duration of this one-shot pulse is set to be sufficiently longer than the period until the forward curtain of the camera is completely released in the case when the camera shutter is used. This is done for permitting the actual exposure to be started after the camera shutter has been fully released. With the appearance of the one-shot pulse both the inputs to the NAND gate 80 become the H level at the same time, so that the output signal of this NAND gate 80 is changed to the L level as shown in FIG. 3C. Also, in response to the synchronizing signal the relay 74 is energized to open the relay switch 62. Since a slight delay time is involved in the response of the relay 74, the relay switch 62 is actually opened after the lapse of a slight delay time from the rising of the synchronizing signal. In this embodiment, the delay time is shorter than the output pulse duration of the one-shot multivibrator 76. At this time, the output signal of the operational amplifier 60 is still at the level as shown in FIG. 3F, so that the output signal of the NAND gate 70 remains at the H level as shown in FIG. 3F. Thus, the output signal of the NAND gate 82 is changed to the H level, so that the output signal of the inverter 84 is changed to the L level as shown in FIG. 3G. As a result, the transistor 86 is cut off to de-energize the solenoid 88, so that light from the xenon lamp 36 is blocked.

With the change of the output signal of the one-shot multivibrator 76 to the L level, the output signal of the NAND gate 80 is changed to the H level as shown in FIG. 3C. As a result, the output signal of the NAND gate 82 is changed to the L level, so that the output signal of the inverter 84 is changed to the H level as shown in FIG. 3G. Thus, the transistor 86 is triggered to energize the solenoid 88 again so as to permit light from the lamp 36 to be incident on the light guide 10 again, thus illuminating the scene to be photographed and starting the exposure of the film. Meanwhile, the relay switch 62 is opened at the aforementioned timing, whereupon the integration of the output signal of the photodiode 20 amplified by the operational amplifier 44 is started in an integrating circuit which is constituted by the operational amplifier 50 and capacitor 56. Thus, the output signal of the operational amplifier 50 is gradually reduced with the lapse of time as shown in FIG. 3D.

It is to be noted that the commencement of the exposure of the film is delayed after the rising of the synchronizing signal by the output signal of the one-shot multivibrator 76, that is, the exposure is started when the shutter plate is brought back to its position not blocking the incident light with the energization of the rotary solenoid 88 afresh after a delay period corresponding to the pulse duration of the one-shot pulse.

In other words, the timing of the commencement of the integration of the light dose and the timing of the commencement of the exposure of the film do not coincide. The integration of the light dose starts when light actually reaches the film after energization of the rotary solenoid 88 so that a proper exposure is obtained.

When the exposure of the film is proceeded to a proper exposure extent, at which time the output signal of the operational amplifier 50 becomes lower than the threshold value, the output signal of the operational amplifier 60 is changed to the H level as shown in FIG. 3E. Usually, in the endoscopic photographing the stop of the camera is held open, and also the brightness of the scene to be photographed is constant by light from the xenon lamp 36 since the scene in the body cavity is dark. Thus, the threshold value (i.e., proper exposure extent) is determined by the sensitivity of the film and the kind of endoscope. Here, the resistance of the variable resistor 64 is varied according to the sensitivity of the film. With the change of the output signal of the operational amplifier 60 to the H level the output signal of the NAND gate 70 is changed to the L level as shown in FIG. 3F. As a result, the output signal of the NAND gate 82 is changed to the H level to change the output signal of the inverter 84 to the L level as shown in FIG. 3G so as to cut off the transistor 86, thus de-energizing the solenoid 88 and causing the shutter plate 42 to block light from the lamp 36. This brings an end to the illumination of the scene while the shutter of the camera 22 still remains released. Thus, the exposure of the film is ended, and a picture of the proper exposure can be obtained.

Since the output signal of the operational amplifier 60 is supplied through a positive feed back path including the diode 68 and resistor 72 to the input terminal of the operational amplifier 50, the output signal thereof is saturated to the negative side after the proper exposure extent is reached. For this reason, even if noise enters the operational amplifier 50 during a period until the synchronizing signal falls to the L level after the proper exposure is obtained, there is no possibility for the output signal of the operational amplifier 50 to become higher than the threshold value again. Thus, there is no possibility of the erroneous change of the output signal of the operational amplifier 60 back to the L level to change the output signal of the inverter 84 to the H level again so as to cause erroneous energization of the solenoid 88 and thus repeated exposure of the film after the proper photographing. When the output signal of the operational amplifier 50 becomes lower than the threshold value, the output signal of the operational amplifier 60 is changed to the L level. The diode 68 is provided to prevent this signal from being coupled to the operational amplifier 50 in the integrating circuit. The state of connection of this diode in this embodiment is by no means limitative. For instance, its anode may be connected to the output terminal of the operational amplifier 60, and its cathode may be connected to the junction between the first-mentioned input terminal of the operational amplifier 60 and the resistor 66. Further, since the operational amplifier 50 is saturated in a period determined by the time constant of the circuit consisting of the resistor 72 and capacitor 56, the resistor 72 preferably has a low resistance.

The invention is not limited to endoscopic photographing systems, but it can also be applied to other medical apparatus and microscopic photographing systems. In general, it can be applied to a photographing system, in which the scene to be photgraphed is dark and the operation of passing and blocking light from a light source can be substituted for the shutter operation.

What is claimed is:

1. In a light source apparatus for a camera for photographing a dark scene, producing a synchronizing signal during the shutter operation of the camera, receiving light reflected from the scene and producing a light reception signal corresponding to the received light, the improvement comprising the combination of:
a synchronizing terminal for receiving said synchronizing signal from the camera;
a light reception terminal for receiving said light reception signal from the camera;
light source means coupled to said synchronizing terminal and producing light for illuminating the scene responsive to said synchronizing signal;
integrating means coupled to said synchronizing terminal and to said light reception terminal for calculating the received light dose by integrating said light reception signal according to said synchronizing signal to produce an integration signal corresponding to said received light dose at an output of the integrating means;
comparator means coupled to said integrating means for comparing said integration signal and a predetermined signal, and to produce a comparison signal according to the result of comparison at an output thereof;
positive feedback means coupled between the output of said comparator means and the input of said integrating means; and
shutter means coupled to said comparator means for blocking light from said light source means responsive to said comparison signal.

2. A light source apparatus according to claim 1, wherein:

said integrating means includes an operational amplifier having one input terminal connected to said light reception terminal, a capacitor connected between the output of said integrating means and said one input terminal of said operational amplifier, a normally closed switch connected between the opposite terminals of said capacitor, and an actuator connected to sid synchronizing terminal for opening said normally closed switch in response to the generation of said synchronizing signal with a predetermined delay time; and said shutter means includes a multivibrator connected to said synchronizing terminal for producing an output signal for a predetermined delay time responsive to the generation of said synchronizing signal, a gate circuit connected to said synchronizing terminal, comparator means and multivibrator for passing said synchronizing signal for a period after the vanishment of the output signal from said multivibrator until the appearance of said comparison signal, a solenoid energized responsive to the output signal from said gate circuit, and a shutter plate mounted on a member driven by said solenoid.

3. A light source apparatus according to claim 2, wherein said solenoid has a shaft, said shutter plate being mounted on said shaft and serving not to block light from said light source means in the de-energized state of said solenoid and to block said light from said light source means responsive to the energization of said solenoid.

4. A light source apparatus according to claim 1, wherein said positive feedback means includes a diode having an anode connected to the output of said comparator means and a resistor connected between the cathode of said diode and an input of said integrating means, the output signal of said integrating means being saturated responsive to said integrating means being saturated responsive to said comparison signal produced from said comparator means.

5. A light source apparatus according to claim 1, wherein said comparator means includes an element for producing a predetermined signal according to the sensitivity of a photographing film and a comparator for producing a comparison signal when said integration signal coincides with said predetermined signal.

6. A light source apparatus according to claim 2, wherein said positive feedback means includes a diode having an anode connected to the output of said comparator means and a resistor connected between the cathode of said diode and said one input terminal of said operational amplifier of said integrating means, the output signal of said integrating means being saturated responsive to said comparison signal produced from said comparator means.

7. A light source apparatus according to claim 1, wherein said integrating means includes an operational amplifier having an input terminal and an output terminal; a capacitor coupled between the output terminal and input terminal of said operational amplifier; and a normally closed switch circuit coupled between the terminals of said capacitor and coupled to said synchronizing terminal; and means is provided for opening said switch circuit upon lapse of a predetermined time after said synchronization signal has been generated.

8. A light source apparatus according to claim 1, wherein said integrating means has an integration period which is identical to the exposure time of the camera, said integration signal thus having a time duration identical with said exposure time.

9. A light source apparatus used for a camera for photographing a dark scene and producing a synchronizing signal during the shutter operation of the camera, comprising:

a synchronizing terminal for receiving said synchronizing signal;

light receiving means for receiving light reflected from the scene and producing a light reception signal according to the received light;

light source means coupled to said synchronizing terminal and producing light for illuminating the scene responsive to said synchronizing signal;

integrating means coupled to said synchronizing terminal and to said light receiving means for calculating the received light dose by integrating said light reception signal according to said synchronizing signal to produce an integration signal according to said received light dose at an output of the integrating means;

comparator means coupled to said integrating means for comparing said integration signal and a predetermined signal, and to produce a comparison signal according to the result of comparison at an output thereof;

positive feedback means coupled between the output of said comparator means and the input of said integrating means; and shutter means coupled to said comparator means for blocking light from said light source means responsive to said comparison signal.

10. A light source apparatus according to claim 9, wherein:

said integrating means includes an operational amplifier having one input terminal connected to said light reception terminal, a capacitor connected between the output of said integrating means and said one input terminal of said operational amplifier, a normally closed switch connected between the opposite terminals of said capacitor, and an actuator connected to said synchronizing terminal for opening said normally closed switch in response to the generation of said synchronizing signal with a predetermined delay time, and said shutter means includes a multivibrator to said synchronizing terminal for producing an output signal for a predetermined delay time responsive to the generation of said synchronizing signal, a gate circuit connected to said synchronizing terminal, comparator means and multivibrator for passing said synchronizing signal for a period after the vanishment of the output signal from said multivibrator until the appearance of said comparison signal, a solenoid energized responsive to the output signal from said gate circuit, and a shutter plate mounted on a member driven by said solenoid.

11. A light source apparatus according to claim 10, wherein said solenoid has a shaft, said shutter plate being mounted on said shaft and serving not to block light from said light source means in the de-energized state of said solenoid and to block said light from said light source means responsive to the energization of said solenoid.

12. A light source apparatus according to claim 9, wherein said positive feedback means includes a diode having a anode connected to the output of said comparator means and a resistor connected between the cathode of said diode and an input of said integrating means, the output signal of said integrating means being saturated responsive to said comparison signal produced from said comparator means.

13. A light source apparatus according to claim 9, wherein said comparator means includes an element for producing a predetermined signal according to the sensitivity of a photographing film and a comparator for producing a comparison signal when said integration signal coincides with said predetermined signal.

14. A light source apparatus according to claim 9, wherein said integrating means includes an operational amplifier having an input terminal and an output terminal; a capacitor coupled between the output terminal and input terminal of said operational amplifier; and a normally closed switch circuit coupled between the terminals of said capacitor and coupled to said synchronizing terminal; and means is provided for opening said switch circuit upon lapse of a predetermined time after said synchronization signal has been generated.

15. A light source apparatus according to claim 10, wherein said positive feedback means includes a diode having an anode connected to the output of said comparator means and a resistor connected between the cathode of said diode and said one input terminal of said operational amplifier of said integrating means, the output signal of said integrating means being saturated responsive to said comparison signal produced from said comparator means.

16. A light source apparatus according to claim 9, wherein said integrating means has an integration period which is identical to the exposure time of the camera, said integration signal thus having a time duration identical with said exposure time.

* * * * *

UNITED STATES PATENT AND TRADEMARK OFFICE
CERTIFICATE OF CORRECTION

PATENT NO. : 4,325,618
DATED : April 20, 1982
INVENTOR(S) : Seiichi HOSODA

It is certified that error appears in the above—identified patent and that said Letters Patent is hereby corrected as shown below:

Column 1, line 5, "relates to light source" should read
--relates to a light source--;

Column 7, line 38, delete "integrating means being";
line 39, delete "saturated responsive to said".

Title Page, under heading "Foreign Application Priority Data":
"54-17867" should read --54-117867--.

Signed and Sealed this

Third Day of August 1982

[SEAL]

Attest:

GERALD J. MOSSINGHOFF

Attesting Officer   Commissioner of Patents and Trademarks